United States Patent
Griffin et al.

(10) Patent No.: US 12,088,469 B2
(45) Date of Patent: Sep. 10, 2024

(54) DOMAIN SPECIFIC LANGUAGE FOR PROTECTED MESH COMMUNICATION

(71) Applicant: Red Hat, Inc., Raleigh, NC (US)

(72) Inventors: Leigh Griffin, Waterford (IE); Pierre-Yves Chibon, Saint-Pol-de-Léon (FR)

(73) Assignee: Red Hat, Inc., Raleigh, NC (US)

( * ) Notice: Subject to any disclaimer, the term of this patent is extended or adjusted under 35 U.S.C. 154(b) by 24 days.

(21) Appl. No.: 17/825,044

(22) Filed: May 26, 2022

(65) Prior Publication Data

US 2023/0388186 A1 Nov. 30, 2023

(51) Int. Cl.
*H04L 41/0893* (2022.01)
*H04L 9/40* (2022.01)
*H04L 61/45* (2022.01)
*H04L 101/668* (2022.01)

(52) U.S. Cl.
CPC .......... *H04L 41/0893* (2013.01); *H04L 61/45* (2022.05); *H04L 63/101* (2013.01); *H04L 63/102* (2013.01); *H04L 2101/668* (2022.05)

(58) Field of Classification Search
None
See application file for complete search history.

(56) References Cited

U.S. PATENT DOCUMENTS 8,949,949 B1 * 2/2015 Sella ................... H04W 12/041 726/21

10,673,862 B1 * 6/2020 Threlkeld ............... G06F 21/62
10,904,078 B2   1/2021 Joshi et al.
10,936,957 B2   3/2021 Ackerman et al.
(Continued)

FOREIGN PATENT DOCUMENTS

CN     106452727 A  *  2/2017  .......... G06Q 20/065
WO  WO-2022253083 A1  * 12/2022

OTHER PUBLICATIONS

Salman et al., "Domain-Specific Languages for IoT: Challenges and Opportunities" 4th International Conference on Engineering Sciences, Jun. 2021, IOP Conf. Ser.: Mater. Sci. Eng. 1067 012133, pp. 1-10.
(Continued)

*Primary Examiner* — Ario Etienne
*Assistant Examiner* — Mohammad Yousuf A. Mian
(74) *Attorney, Agent, or Firm* — Womble Bond Dickinson (US) LLP (57) ABSTRACT

A system and method of protecting communication in a mesh network of nodes. The method including receiving a request from a joiner node of the mesh network to join the mesh network. The method including validating permissions for the joiner node responsive to receiving the request. The method including acquiring one or more dictionary objects based on the permissions. The method including granting, by a control node of a mesh network, access rights for the joiner node to join the mesh network by transmitting an access rights message comprising the one or more dictionary objects to the joiner node, wherein the access rights message causes the joiner node to locally store the one or more dictionary objects and use the one or more dictionary objects when communicating with one or more nodes of the mesh network.

20 Claims, 5 Drawing Sheets

(56) References Cited

U.S. PATENT DOCUMENTS

| | | | | |
|---|---|---|---|---|
| 2012/0284773 | A1* | 11/2012 | Gamer | H04L 9/083 |
| | | | | 726/3 |
| 2019/0121801 | A1 | 4/2019 | Jethwa et al. | |
| 2019/0363897 | A1* | 11/2019 | Papadimitriou | H04L 9/3234 |
| 2020/0092097 | A1* | 3/2020 | Chiu | G06Q 20/3678 |
| 2021/0092103 | A1* | 3/2021 | Acharya | H04L 63/0272 |

OTHER PUBLICATIONS

Sneps-Sneppe et al., "On web-based domain-specific language for Internet of Things," 2015 7th International Congress on Ultra Modern Telecommunications and Control Systems and Workshops (ICUMT), 2015, pp. 287-292, doi: 10.1109/ICUMT.2015.7382444.

Barriga et al., "SimulateIoT: Domain Specific Language to Design, Code Generation and Execute IoT Simulation Environments," in IEEE Access, vol. 9, p. 92531-92552, 2021, doi: 10.1109/ACCESS.2021.3092528.

Gomes et al., "A modeling domain-specific language for IoT-enabled operating systems," IECON 2017—43rd Annual Conference of the IEEE Industrial Electronics Society, 2017, pp. 3945-3950, doi: 10.1109/IECON.2017.8216675.

* cited by examiner

DOMAIN SPECIFIC LANGUAGE FOR PROTECTED MESH COMMUNICATION

TECHNICAL FIELD

The present disclosure relates generally to software technology, and more particularly, to systems and methods of protecting communication in a mesh network of nodes using domain specific language.

BACKGROUND

A mesh network is a network in which devices—or nodes—are linked together, branching off other devices or nodes. These networks are set up to efficiently route data between devices and clients. They help organizations provide a consistent connection throughout a physical space.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Software running on nodes within a mesh can include programming language ecosystems such as Java, Python or Javascript. Domain Specific Language (DSLs) are used to create a customized language that represents the domain such that domain experts can easily interpret it. Such languages are highly customized to be strong at and good at certain roles rather than a more generic language. DSLs require their own compiler and interpreters and DSLs come in two flavors, an external DSL and an internal DSL with the latter being a language constructed within another general language, leveraging the host languages tooling. However, within clusters or Internet of Things (IoT) like environments where devices can enter and interact with other devices, there is a problem with ensuring security and communication between the nodes, especially if a node maliciously gains unauthorized access to secure regions of the mesh network. Thus, there is a long felt need to solve the problem related to access control and interpretation of private messages and execution asks within a mesh network.

Aspects of the present disclosure address the above-noted and other deficiencies by protecting communication in a mesh network using a DSL. As discussed in greater detail below, a control mesh node of a mesh network executes a Mesh Dictionary Service (MDS) agent that acquires a dictionary object (sometimes referred to as, "object dictionary") and make it available to requesting nodes of the mesh network that have adequate permissions and need to utilize the internal mesh DSL for service purposes. The control mesh node validates the node to ascertain trust before granting the dictionary object to the node. That is, the MDS agent receives a request from the node, validates the permissions of the node, and grants the node access to the mesh network by sharing the dictionary object with the node. The object is an instantiation of an object oriented-style class (such as in Java), which is made available to a running agent on the node, in the same host language using something like Remote Method Invocation (RMI) or other object transfer approaches. Once the dictionary object is received, the receiving node can then store this object in memory and utilize the dictionary as a means to interpret the instructions encoded within the base programming language and which will form part of standard communication headers between devices.

A benefit of this approach is homogenization of the course code, wherein a language embedded within is not interpretable and can be awoken so to speak by having the right dictionary. This means that all devices have the same service capability but crucially will not be able to interpret or act upon the code paths contained within unless it has the right dictionary. This approach allows for embodiments that range from the intelligent encoding of Role-Based Access Code (RBAC) style policies within a DSL to allowing for cryptographic information to be stored right through to an internal message bus paradigm enabled by the language. This would see a very simple benefit of allowing nodes join the mesh with common language capabilities installed but would not be able to participate in certain mesh communications such as message buses or invoking application-specific interfaces (APIs) that utilize the DSL descriptors until granted permission which is the dictionary. In one embodiment, the DSL would become part of an Multi Factor Authentication approach wherein one challenge would be to answer and respond in the mesh language using the same language.

Figure 1:
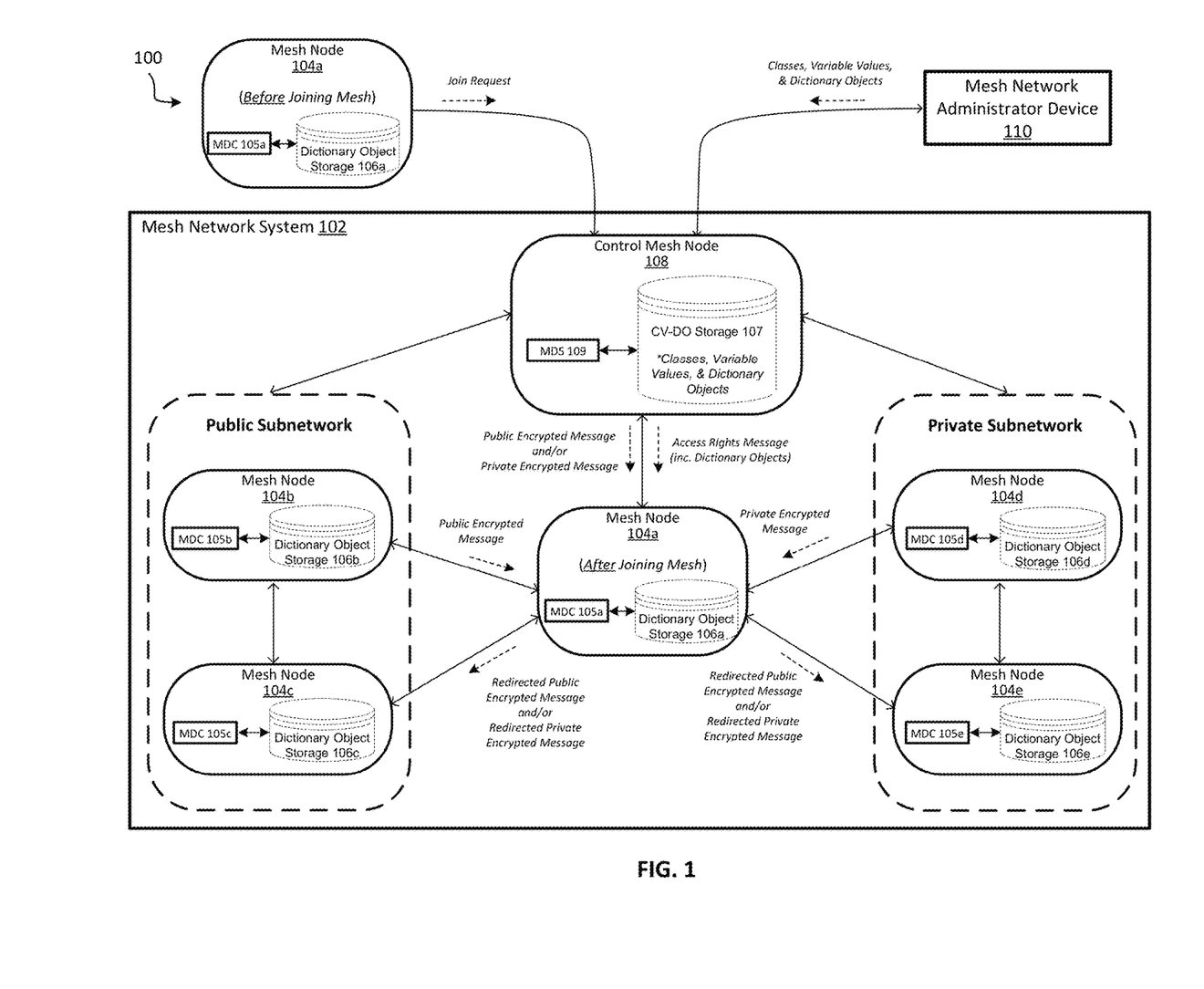
FIG. 1 is a block diagram depicting an example environment for protecting communication in a mesh network of nodes, according to some embodiments.

FIG. 1 is a block diagram depicting an example environment for protecting communication in a mesh network of nodes, according to some embodiments. The environment 100 includes a mesh network system 102 (sometimes referred to as, "mesh network") and a mesh network administrator device 110. The mesh network system 102 includes a public subnetwork associated with a public dictionary object and a private subnetwork associated with a private dictionary object. The mesh network system 102 includes mesh nodes 104 (e.g., mesh nodes 104a, 104b, 104c, 104d, 104e). Each mesh node includes a dictionary object storage 106 for storing one or more dictionary objects (sometimes referred to as a, "DSLs"). Specifically, the mesh node 104a includes a dictionary object storage 106a, the mesh node 104b includes a dictionary object storage 106b, the mesh node 104c includes a dictionary object storage 106c, the mesh node 104d includes a dictionary object storage 106d, and the mesh node 104e includes a dictionary object storage 106e.

The mesh nodes 104b, 104c are members of and/or are included in the public subnetwork and each locally store, in their respective dictionary object storages 106, a copy of the public dictionary object that is used to encrypt/decrypt the messages (e.g., either the entire message or portions of the message) that are communicated between the mesh nodes 104 of the public subnetwork. Conversely, mesh nodes 104d, 104e are members of and/or are included in the private subnetwork and each locally store, in their respective dictionary object storages 106, a copy of the private dictionary object that is used to encrypt/decrypt the messages (e.g., either the entire message or portions of the message) that are communicated between the mesh nodes 104 of the private subnetwork. The mesh nodes 104 (e.g., mesh node 104d, 104e) that have the appropriate permissions to join the private subnetwork might also have the appropriate permissions to join the public subnetwork. For example, mesh nodes 104d, 104e are members of both the private subnetwork and the public subnetwork, thereby allowing each of the mesh nodes 104d,104e to have access to (and store) a copy of the private dictionary object and a copy of the public dictionary object. However, mesh nodes 104 (e.g., mesh node 104b, 104c) that do not have the appropriate permissions to join the private subnetwork are prohibited from joining the private subnetwork. As such, the mesh nodes 104 (e.g., mesh node 104b, 104c) that can only join the public subnetwork will only have access to the public dictionary object.

It should be noted that the phrase "private" in the private dictionary object that is associated with the private subnetwork and the phrase "public" in the public dictionary object associated with the public subnetwork are each not being used to indicate that the dictionary objects are defined as being public or private objects in the context of the base language (e.g., Java, etc.). Rather, the phrases "public" and "private" are simply being used to clarify that the public dictionary object is different from the private dictionary object.

As shown in FIG. 1, mesh node 104a (sometimes referred to as, "joiner node 104a") resides outside of the mesh network system 102 prior to joining the mesh network system 102, but resides inside the mesh node system 102 after joining the mesh network system 102. Upon joining the mesh network system 102, the mesh node 104a is added to the public subnetwork and/or the private subnetwork (despite being shown in FIG. 1 outside of the public and private subnetwork) based on the permissions associated with the mesh node 104a.

The mesh network system 102 includes a control mesh node 108 (sometimes referred to as, "control node"), which is a mesh node 104 that is further configured with additional administrative functionality for controlling and/or managing the other mesh nodes 104 in the mesh network system 102. The control mesh node 108 is communicably coupled to the mesh network administrator device 110 via an external network (not shown in FIG. 1). As discussed herein, the control mesh node 108 is configured to determine whether a mesh node 104 is permitted to join, or stay joined to, the one or more subnetworks of the mesh network system 102 based on the permissions associated with the mesh node 104a, and then add (or remove) the mesh node 104 to the one or more subnetworks of the mesh network system 102.

The control mesh node 108 includes a Class, Member Variable Values, & Dictionary Object (CV-DO) storage 107 for storing (a) classes, (b) member variable values for initializing the classes, and (c) dictionary objects. The control mesh node 108 may receive the classes, member variable values, and/or the dictionary objects from the mesh network administrator device 110.

Each of the mesh nodes 104 execute a mesh dictionary client (MDC) agent 105. Specifically, the mesh node 104a executes an MDC agent 105a, the mesh node 104b executes an MDC agent 105b, the mesh node 104c executes an MDC agent 105c, the mesh node 104d executes an MDC agent 105d, and the mesh node 104e executes an MDC agent 105e.

The MDC agent 105 of a mesh node 104 (e.g., joiner node 104a) is configured to send a request (shown in FIG. 1 as, "join request") to the control mesh node 108 to join the mesh network system 102. The request may include information (e.g., a device identification, a device type (e.g., insulin pump, smartphone, smartwatch, etc.), security policies, permissions, etc.) associated with the mesh node 104 (e.g., joiner node 104a), which the control mesh node 108 may then use to validate whether the mesh node 104 (e.g., joiner node 104a) has the permission to join one or more subnetworks of the mesh network system 102. The MDC agent 105 is configured to receive an access rights message (e.g., shown in FIG. 1 as, "access rights message") from the control mesh node 108, where the access rights include a public dictionary object indicating that the mesh node 104 (e.g., joiner node) has been added to the public subnetwork and/or a private dictionary object indicating that the mesh node 104 (e.g., joiner node) has been added to the private subnetwork.

The MDC agent 105 of a mesh node 104 (e.g., joiner node 104a) stores a copy of the dictionary objects that it receives from the control mesh node 108 in its dictionary object storage 106 and uses the appropriate dictionary object to encrypt/decrypt communication between mesh nodes 104 of the public subnetwork and/or private subnetwork. For example, the MDC agent 105 selects/uses the public dictionary object to encrypt/decrypt the messages that are communicated between the mesh nodes 104 of the public subnetwork. If the MDC agent 105 has the appropriate permissions, then the MDC agent 105 selects/uses the private dictionary object to encrypt/decrypt the messages (e.g., the entire message or portions of the message) that are communicated between the mesh nodes 104 of the private subnetwork.

If a mesh node (e.g., joiner node 104a) receives a message that is entirely encrypted with the public dictionary object, then the MDC agent 105 of the joiner node 104a may entirely decrypt the message to generate a decrypted message that can be fully understood (e.g., read) by the joiner node 104a. If the joiner node 104a is a member of the private subnetwork and receives a message that is entirely encrypted with the private dictionary object, then the MDC agent 105 of the joiner node 104a may entirely decrypt the message to generate a decrypted message that can be fully understood (e.g., read) by the joiner node 104a.

However, if the joiner node 104a is only a member of the public subnetwork and receives a message that includes a first portion (e.g., the message header) encrypted with the public dictionary object and a second portion (e.g., data) encrypted with the private dictionary object, then the MDC agent 105 of the joiner node 104a may only decrypt the first portion of the message using its public dictionary object. That is, the joiner node 104a will be unable to decrypt the entire message because the joiner node 104a does not have access to the private dictionary object that is required to decrypt the remaining portions (e.g., data payload) of the message. Thus, after decrypting the first portion of the message, the joiner node 104a will be left with the remaining portions of the message that are still encrypted.

The joiner node 104a may redirect messages to any of its neighboring mesh nodes. For example, the joiner node 104a may receive a "private" message (shown in FIG. 1 as, "Private Encrypted Message") from mesh node 104d, where a portion of the message is encrypted with the private dictionary object. The joiner node 104a may decrypt the private message using its public dictionary object to decrypt (e.g., reveal) the header portion of the message, but where the remaining data portion of the message is still encrypted. The joiner node 104a may then determine that the decrypted header indicates that one or more of its neighboring nodes are the intended recipients of the message. As such, the joiner node 104a may redirect the private message (shown in FIG. 1 as, "Redirected Private Encrypted Message") to the appropriate mesh nodes (e.g., mesh node 104c, mesh node 104e, etc.).

As another example, the joiner node 104a may receive a "public" message (shown in FIG. 1 as, "Public Encrypted Message") from mesh node 104b, where the entire message is encrypted with the public dictionary object. As such, the joiner node 104a may decrypt the entire message (e.g., header and data) to generate a decrypted message. The joiner node 104a may then determine that the decrypted header indicates that one or more of its neighboring nodes are the intended recipients of the message. As such, the joiner node 104a may redirect the public message (shown in FIG. 1 as, "Redirected Public Encrypted Message") to the appropriate mesh nodes (e.g., mesh node 104c, mesh node 104e, etc.), where the redirected message is still in its encrypted form.

Each mesh node (e.g., mesh node 104a, control mesh node 108, etc.) of a mesh network system (e.g., mesh network system 102, mesh network system 112) is positioned (e.g., arranged, organized) within the mesh network system, such that the mesh node may be within a minimum physical distance (e.g., up to 10 meters with a Bluetooth connection, up to 46 meters with a wireless local area network (WLAN) connection) of neighboring mesh nodes to be able to communicate with its neighboring nodes by using one or more types of communication capabilities.

As shown in FIG. 1, the mesh node 104a has neighboring mesh nodes that include control mesh node 108 and mesh nodes 104b, 104c, 104d, 104e when using a first type of communication capability (e.g., a Bluetooth, etc.). The mesh node 104b has neighboring mesh nodes that include mesh nodes 104c, 104a, and control mesh node 108 when using the first type of communication capability. The mesh node 104c has neighboring mesh nodes that include mesh nodes 104a, 104b when using the first type of communication capability. The mesh node 104d has neighboring mesh nodes that include mesh nodes 104a, 104e and control mesh node 108 when using the first type of communication capability. The mesh node 104e has neighboring mesh nodes that include mesh node 104a, 104d when using the first type of communication capability.

A mesh node (e.g., mesh node 104a, control mesh node 108, etc.) may have a greater number of neighboring mesh nodes when using a second type of communication capability (e.g., a WLAN connection). For example, the mesh node 104b may expand its neighboring mesh nodes to also include mesh nodes 104d, 104e when using the second type of communication capability. The mesh node 104c may expand its neighboring mesh nodes to also include mesh node 104d, 104e and control mesh node 108 when using the second type of communication capability. The mesh node 104d may expand its neighboring mesh nodes to also include mesh nodes 104d, 104c when using the second type of communication capability. The mesh node 104e may expand its neighboring mesh nodes to also include mesh node 104b, 104c and control mesh node 108 when using the second type of communication capability.

A mesh node (e.g., mesh node 104a, control mesh node 108, etc.) may directly communicate with its neighboring mesh nodes 104 by using one or more types of communication capabilities. A communication capability may include the hardware and/or software resources for communicating via a Bluetooth (BT) connection, a WLAN connection, and/or a near field communication (NFC) connection. In some embodiments, a mesh node 104 includes the hardware and/or software resources for communicating via a cellular network (e.g., LTE, 5G, etc.), which allow the mesh node 104 to communicate with computing devices outside of the mesh network system 102. In some embodiments, a mesh node 104 does not include the hardware and/or software resources for communicating via a cellular network (e.g., LTE, 5G, etc.), which prevent the mesh node 104 from communicating with computing devices outside of the mesh network system 102.

In some embodiments, a mesh node (e.g., mesh node 104a, control mesh node 108, etc.) may be unable to directly communicate with a non-neighboring mesh node when using a particular communication capability because the non-neighboring node is outside of the radio frequency (RF) range of the particular communication capability. In some embodiments, a mesh node that is unable to directly communicate with a non-neighboring mesh node may indirectly communicate with the non-neighboring node by directly communicating through a neighboring mesh node. For example, if the control mesh node 108 wants to communicate with the mesh node 104a, then the control mesh node 108 may send a first message (shown in FIG. 1 as, "Public Encrypted Message and/or Private Encrypted Message") to mesh node 104a to cause the mesh node 104a to send a second message (shown in FIG. 1 as, Public Encrypted Message and/or Private Encrypted Message") to the mesh node 104c, where the second message indicates the details of the first message. As another example, if the mesh node 104b wants to communicate with the mesh node 104e, then the mesh node 104b may send a first message (shown in FIG. 1 as, "Public Encrypted Message") to mesh node 104a to cause the mesh node 104a to redirect (e.g., forward, propagate) the first message to the mesh node 104e.

A mesh node 104 may be configured to discover its neighboring mesh nodes by broadcasting a ping message outward using a particular communication capability and identifying the mesh nodes that responds to the ping message as its neighboring mesh nodes. For example, the mesh node 104a may transmit ping messages toward the mesh nodes 104b, 104c, 104d, 104e and control mesh node 108 to cause each of the nodes to either respond with an acknowledgement (e.g., an ACK) or not respond (e.g., stay silent).

An external network may be a public network (e.g., the internet), a private network (e.g., a local area network (LAN) or wide area network (WAN)), or a combination thereof. In some embodiments, an external network may include a wired or a wireless infrastructure, which may be provided by one or more wireless communications systems, such as wireless fidelity (Wi-Fi) connectivity to the external network and/or a wireless carrier system that can be implemented using various data processing equipment, communication towers (e.g. cell towers), etc. The external network may carry communications (e.g., data, message, packets, frames, etc.) between any other the computing device.

A mesh node 104, the control mesh node 108, and a mesh network administrator device 110 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may include a single machine or may include multiple interconnected machines (e.g., multiple servers configured in a cluster).

In some embodiments, the mesh node 104, the control mesh node 108, and the mesh network administrator device 110 may each be a wearable device (e.g., smartwatch, smart clothing, smart glasses, smart jewelry, wearable camera, wireless earbuds, fitness tracker, blood pressure monitor, heart rate monitor, etc.) or an implantable device (e.g., insulin pump, cochlear device, pacemaker, brain simulator, etc.).

Still referring to FIG. 1, the control mesh node 108 executes a mesh dictionary service (MDS) agent 109 that is configured to receive a request from a mesh node 104 (e.g., joiner node 104a) to join the mesh network system 102, where the joinder node 104a is not yet a member of the mesh network system 102. The control mesh node 108 uses the information in the request (e.g., device identifier, device type, permissions, etc.) to validate whether the joiner node 104a has the appropriate permissions to join one or more subnetworks of the mesh network system 102. The control mesh node 108 identifies, based on the permissions, the one or more subnetworks that the joiner node 104a is permitted to join and then acquires the one or more dictionary objects that are associated with those subnetworks. In some embodiments, the control mesh node 108 may acquire a dictionary object by creating the dictionary object using information that is stored in the CV-DO storage 107. For example, the control mesh node 108 may create (e.g., generate) a public dictionary object by initializing a base class using a first set of variables (sometimes referred to as, "public variables"), and create a private dictionary object by initializing the same base class using a set of second set of variables (e.g., sometimes referred to as, "private variables"). The control mesh node 108 may create a public dictionary object by initializing a first base class (sometimes referred to as, "public base class") using the first set of variables and create a private dictionary object by initializing a second base class (sometimes referred to as, "private base class") using the second set of variables. In some embodiments, the control mesh node 108 may receive the dictionary objects from the mesh network administrator device 110.

The control mesh node 108 grants access rights for the joiner node 104a to join one or more subnetworks of the mesh network system 102 by transmitting an access rights message that includes the one or more dictionary objects to the joiner node 104a. The access rights message causes the joiner node 104a to locally store the one or more dictionary objects in its dictionary object storage 106a, and use the one or more dictionary objects to encrypt/decrypt the communication it has with other mesh nodes 104 in the mesh network system 102. Thus, the control mesh node 108 is able to provide a mechanism for the mesh nodes 104 in the mesh network system 102 to protect their communication by only sharing the dictionary objects with those mesh nodes 104 that have the appropriate permissions to decrypt the secured communications.

Although FIG. 1 shows only a select number of computing devices (e.g., mesh nodes 104, control mesh node 108, and mesh network administrator device 110), the environment 100 may include any number of computing devices that are interconnected in any arrangement to facilitate the exchange of data between the computing devices. Furthermore, the public subnetwork and the private subnetwork are shown in FIG. 1 in order to explain that the mesh network system 102 may be divided into subnetworks. However, in other embodiments, the mesh network system 102 may have any number of subnetworks (including no subnetworks), and the control mesh node 108 may create any number of dictionary objects associated with the subnetworks in order to protect the communication between any number of mesh nodes 104 in the mesh network system 102.

Figure 2A:
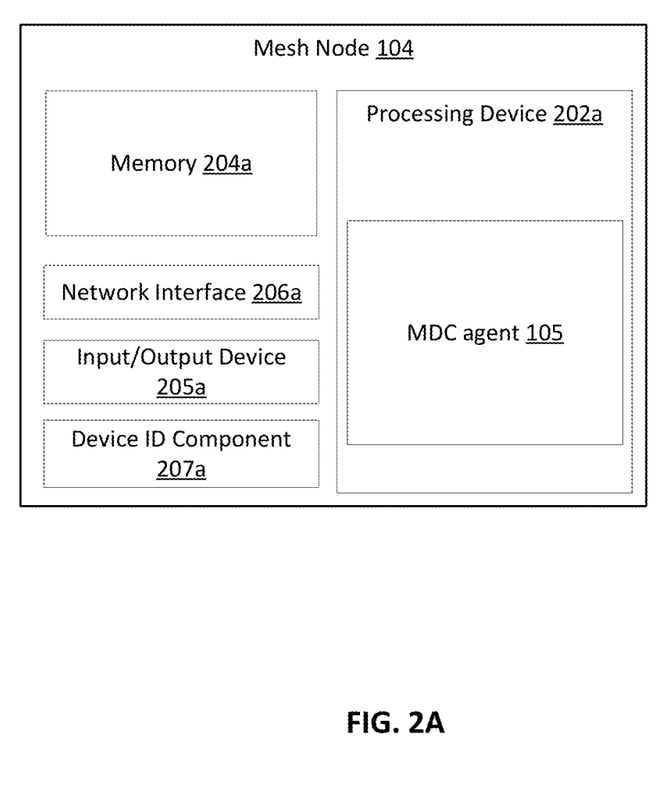
FIG. 2A is a block diagram depicting an example mesh node 104 of the mesh network system 102 in FIG. 1, according to some embodiments.

FIG. 2A is a block diagram depicting an example mesh node 104 of the mesh network system 102 in FIG. 1, according to some embodiments. While various devices, interfaces, and logic with particular functionality are shown, it should be understood that the one or more mesh nodes 104 (e.g., mesh nodes 104a-i) of the mesh network system 102 each include any number of devices and/or components, interfaces, and logic for facilitating the functions described herein. For example, the activities of multiple devices may be combined as a single device and implemented on a same processing device (e.g., processing device 202a), as additional devices and/or components with additional functionality are included.

The mesh node 104 includes a processing device 202a (e.g., general purpose processor, a PLD, etc.), which may be composed of one or more processors, and a memory 204a (e.g., synchronous dynamic random access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may include one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the mesh node 104. In some embodiments, the processing device 202a and the memory 204a form various processing devices and/or circuits described with respect to the mesh node 104. The instructions include code from any suitable computer programming language such as, but not limited to, C, C++, C #, Java, JavaScript, VBScript, Perl, HTML, XML, Python, TCL, and Basic.

The processing device 202a may execute a mesh dictionary client (MDC) agent 105 that is configured to send a request to the control mesh node 108 to join the mesh network system 102. The MDC agent 105 is configured to receive an access rights message from the control mesh node 108, where the access rights include a public dictionary object indicating that the mesh node 104 (e.g., joiner node) has been added to the public subnetwork and/or a private dictionary object indicating that the mesh node 104 (e.g., joiner node) has been added to the private subnetwork. The MDC agent 105 is configured to store the dictionary objects that it receives from the control mesh node 108 in its dictionary object storage 106.

In some embodiments, a private message may include at least one of an application programming interface (API) endpoint, a seed phrase, or an access token. In some embodiments, a private message (when decrypted) may cause a mesh node 104 to install one or more application components.

The MDC agent 105 is configured to receive a public message (e.g., public encrypted message) from a mesh node 104 (e.g., mesh node 104b, 104c) in the public subnetwork, and decrypt the public message using one or more public dictionary objects to generate a decrypted message. The MDC agent 105 is configured to receive a private message (e.g., private encrypted message) from a mesh node 104 (e.g., mesh node 104d, 104e) in the private subnetwork, and decrypt the private message using one or more private dictionary objects to generate a decrypted message.

In some embodiments, the MDC agent 105 may be configured to support multi-factor authentication. For example, the MDC agent 105 may receive a private message from mesh node 104d of the private subnetwork, where the private message is in a first language. The MDC agent 105 may decrypt the private message using the private dictionary object to generate a decrypted message. The MDC agent 105 may generate a response message using the private dictionary object, where the response message is also in the first language. The MDC agent 105 may then send the response message to the mesh node 104d of the private subnetwork, where the mesh node 104d may confirm that the joiner node 104a of the MDC agent 105 is authenticated because the joiner node 104a sent a response message that was in the same language as the private message.

The mesh node 104 includes a network interface 206a configured to establish a communication session with a computing device for sending and receiving data over a communication network to the computing device. Accordingly, the network interface 206a includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the mesh node 104 includes a plurality of network interfaces 206a of different types, allowing for connections to a variety of networks, such as local area networks (public or private) or wide area networks including the Internet, via different sub-networks.

The mesh node 104 includes an input/output device 205a configured to receive user input from and provide information to a user. In this regard, the input/output device 205a is structured to exchange data, communications, instructions, etc. with an input/output component of the mesh node 104. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the mesh node 104, such as a built-in display, touch screen, microphone, etc., or external to the housing of the mesh node 104, such as a monitor connected to the mesh node 104, a speaker connected to the mesh node 104, etc., according to various embodiments. In some embodiments, the mesh node 104 includes communication circuitry for facilitating the exchange of data, values, messages, and the like between the input/output device 205a and the components of the mesh node 104. In some embodiments, the input/output device 205a includes machine-readable media for facilitating the exchange of information between the input/output device 205a and the components of the mesh node 104. In still another embodiment, the input/output device 205a includes any combination of hardware components (e.g., a touchscreen), communication circuitry, and machine-readable media.

The mesh node 104 includes a device identification component 207a (shown in FIG. 2A as device ID component 207a) configured to generate and/or manage a device identifier (sometimes referred to as, "mesh node ID") associated with the mesh node 104. The device identifier may include any type and form of identification used to distinguish the mesh node 104 from other computing devices. In some embodiments, to preserve privacy, the device identifier may be cryptographically generated, encrypted, or otherwise obfuscated by any device and/or component of mesh node 104. In some embodiments, the mesh node 104 may include the device identifier in any communication (e.g., public encrypted message, private encrypted message, etc.) that the mesh node 104 sends to a computing device.

The mesh node 104 includes a bus (not shown), such as an address/data bus or other communication mechanism for communicating information, which interconnects the devices and/or components of mesh node 104, such as processing device 202a, network interface 206a, input/output device 205a, and/or device ID component 207a.

In some embodiments, some or all of the devices and/or components of mesh node 104 may be implemented with the processing device 202a. For example, the mesh node 104 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

Figure 2B:
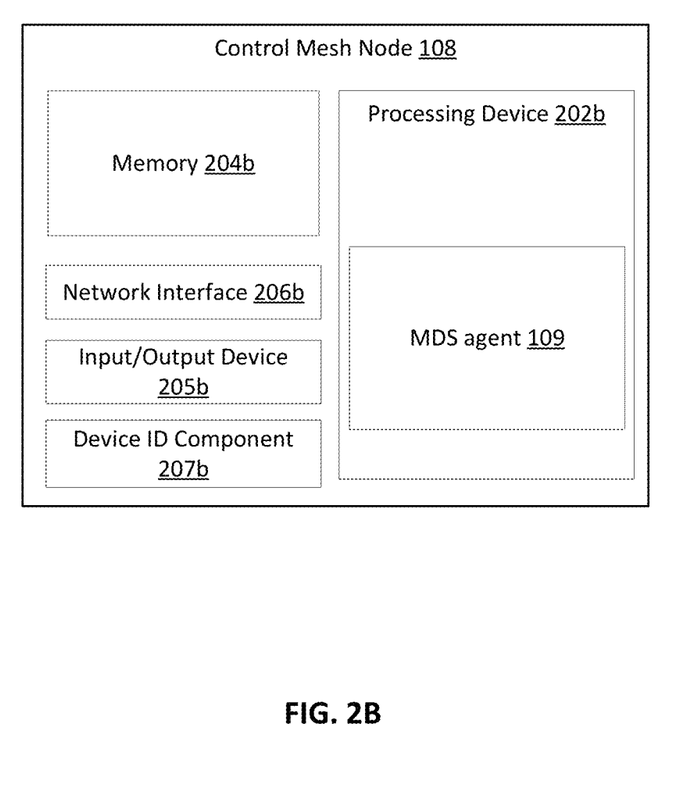
FIG. 2B is a block diagram depicting an example of the control mesh node 108 of the environment in FIG. 1, according to some embodiments.

FIG. 2B is a block diagram depicting an example of the control mesh node 108 of the environment in FIG. 1, according to some embodiments. While various devices, interfaces, and logic with particular functionality are shown, it should be understood that the control mesh node 108 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The control mesh node 108 includes a processing device 202b (e.g., general purpose processor, a PLD, etc.), which may be composed of one or more processors, and a memory

204*b* (e.g., synchronous dynamic random access memory (DRAM), read-only memory (ROM)), which may communicate with each other via a bus (not shown). The processing device 202*b* includes identical or nearly identical functionality as processing device 202*a* in FIG. 2*a*, but with respect to devices and/or components of the control mesh node 108 instead of devices and/or components of the mesh node 104.

The memory 204*b* of processing device 202*b* stores data and/or computer instructions/code for facilitating at least some of the various processes described herein. The memory 204*b* includes identical or nearly identical functionality as memory 204*a* in FIG. 2A, but with respect to devices and/or components of the control mesh node 108 instead of devices and/or components of the mesh node 104.

The processing device 202*b* may execute a mesh dictionary service (MDS) agent 105 that is configured to receive classes, member variable values (e.g., integers, floating-point number) and/or dictionary objects from the mesh network administrator device 110. A class is an extensible program-code-template for creating objects using an object-oriented programming language (e.g., Java, C++, C #, Python, etc.), providing initial values for state (e.g., member variables) and implementations of behavior (e.g., member functions or methods). An object can be a combination of variables, functions, and data structures; and in particular in class-based variations of the paradigm it refers to a particular instance of a class. The processing device 202*a* may be configured to store the information that it receives from the mesh network administrator device 110 in the CV-DO storage 107.

The MDS agent 105 may be configured to validate permissions for the joiner node 104*a* responsive to receiving the request. In some embodiments, the MDS agent 105 may validate permissions for the joiner node 104*a* by using public key cryptography (e.g., asymmetric encryption). In some embodiments, the MDS agent 105 may validate permissions for the joiner node 104*a* by determining a first permission (e.g., allowed) of the joiner node 104*a* to join a public subnetwork of the mesh network system 102, and creating a public dictionary object associated with the public subnetwork responsive to determining the first permission. In some embodiments, the MDS agent 105 may validate permissions for the joiner node 104*a* by determining a second permission (e.g., allowed) of the joiner node 104*a* to join a private subnetwork of the mesh network system 102; and creating a private dictionary object associated with the private subnetwork responsive to determining the second permission.

The MDS agent 105 may be configured to acquire one or more dictionary objects that are associated with those subnetworks. In some embodiments, the control mesh node 108 may acquire a dictionary object by creating the dictionary object using information that is stored in the CV-DO storage 107. For example, the control mesh node 108 may create (e.g., generate) a public dictionary object by initializing a base class using a first set of variables (sometimes referred to as, "public variables"), and create a private dictionary object by initializing the same base class using a set of second set of variables (e.g., sometimes referred to as, "private variables"). The control mesh node 108 may create a public dictionary object by initializing a first base class (sometimes referred to as, "public base class") using the first set of variables and create a private dictionary object by initializing a second base class (sometimes referred to as, "private base class") using the second set of variables. The first set of variables are different from the second set of variables, and the first base class is different from the second base class.

The MDS agent 105 may be configured to grant access rights for the joiner node 104*a* to join the mesh network system 102 by transmitting an access rights message including the one or more dictionary objects to the joiner node 104*a*. In some embodiments, the MDS agent 105 sends a copy of the public dictionary object and a copy of the private dictionary object to the joiner node 104*a*. In some embodiments, the MDS agent 105 sends a copy of the public dictionary object, but does not send a copy of the private dictionary object to the joiner node 104*a* in order to prevent the joiner node 104*a* from having access to the private dictionary object.

In some embodiments, the access rights message may cause the joiner node 104*a* to locally store the one or more dictionary objects in its dictionary object storage 106*a*. In some embodiments, the access rights message may cause the joiner node 104*a* to use the one or more dictionary objects to encrypt/decrypt communication that it exchanges (e.g., sends/receives) with one or more nodes of the mesh network system 102. For example, the joiner node 104*a* may decrypt a first message that it receives from mesh nodes 104*b* by using the public dictionary object to generate a first decrypted message, and decrypt a second message that it receives from mesh nodes 104*d* by using the private dictionary object to generate a second decrypted message.

In some embodiments, the access rights message may cause the joiner node 104*a* to redirect messages (e.g., public encrypted messages, private encrypted messages) received from other mesh nodes 104 to it intended recipient. For example, the joiner node 104*a* may receive a private encrypted message from mesh node 104*d*, decrypt a portion of a private encrypted message using a public dictionary object from the access rights message to reveal a portion (e.g., header) of the message, determine that the intended recipient of the message is mesh node 104*e*, and then redirect the message to mesh node 104*e*. In some embodiments, the joiner node 104*a* determine whether it has the capability to decrypt all portions of message. If the joiner node 104*a* determines that it is unable to decrypt a portion of a private message, then the joiner node 104*a* may redirect (e.g., forward) that portion (or all portions) of the private message to one or more mesh nodes 104 in the private subnetwork.

The MDS agent 105 may be configured to determine a timing for updating the one or more dictionary objects that have been distributed to the mesh nodes 104 of the mesh node system 102. In some embodiments, the MDS agent 105 may determine that it is time to update the one or more dictionary objects responsive to (a) determining that there has been a change in the permissions (e.g., from allowed to disallowed, or vice versa) for the joiner node 104*a*, (b) determining that there has been a change in available services of the mesh network system 102, and/or (c) determining that the mesh network system 102 has been subjected to a malicious attack that originated from outside the mesh network system 102. The MDS agent 105 may then acquire an updated set of the one or more dictionary objects. For example, the MDS agent 105 may create the updated set of the one or more dictionary objects based on the new permissions.

The MDS agent 105 may be configured to transmit the updated set of the one or more dictionary objects to the joiner node 104*a* to cause the joiner node 104*a* to update the one or more dictionary objects that are locally stored on the joiner node 104*a* using the updated set of the one or more dictionary objects. In some embodiments, a transmission of the updated set of the one or more dictionary objects to the joiner node 104*a* might cause the joiner node 104*a* to replace and/or delete its previously stored dictionary objects with the updated set of the one or more dictionary objects, such that its previously stored dictionary objects are now corrupted and/or inaccessible. This ensures that the joiner node 104*a* may no longer access the private subnetwork if the joiner node's 104*a* permissions have been down-graded from those allowing access to the private subnetwork to those disallowing access to the private subnetwork.

The control mesh node 108 includes a network interface 206*b* configured to establish a communication session with a computing device for sending and receiving data over a network to the computing device. Accordingly, the network interface 206*b* includes identical or nearly identical functionality as network interface 206*a* in FIG. 2A, but with respect to devices and/or components of the control mesh node 108 instead of devices and/or components of the mesh node 104.

The control mesh node 108 includes an input/output device 205*b* configured to receive user input from and provide information to a user. In this regard, the input/output device 205*b* is structured to exchange data, communications, instructions, etc. with an input/output component of the control mesh node 108. The input/output device 205*b* includes identical or nearly identical functionality as input/output device 205*a* in FIG. 2A, but with respect to devices and/or components of the control mesh node 108 instead of devices and/or components of the mesh node 104.

The control mesh node 108 includes a device identification component 207*b* (shown in FIG. 2B as device ID component 207*b*) configured to generate and/or manage a device identifier associated with the control mesh node 108. The device ID component 207*b* includes identical or nearly identical functionality as device ID component 207*a* in FIG. 2A, but with respect to devices and/or components of the control mesh node 108 instead of devices and/or components of the mesh node 104.

The control mesh node 108 includes a bus (not shown), such as an address/data bus or other communication mechanism for communicating information, which interconnects the devices and/or components of the control mesh node 108, such as processing device 202*b*, network interface 206*b*, input/output device 205*b*, and/or device ID component 207*b*.

In some embodiments, some or all of the devices and/or components of control mesh node 108 may be implemented with the processing device 202*b*. For example, the control mesh node 108 may be implemented as a software application stored within the memory 204*b* and executed by the processing device 202*b*. Accordingly, such embodiment can be implemented with minimal or no additional hardware costs. In some embodiments, any of these above-recited devices and/or components rely on dedicated hardware specifically configured for performing operations of the devices and/or components.

Figure 2C:
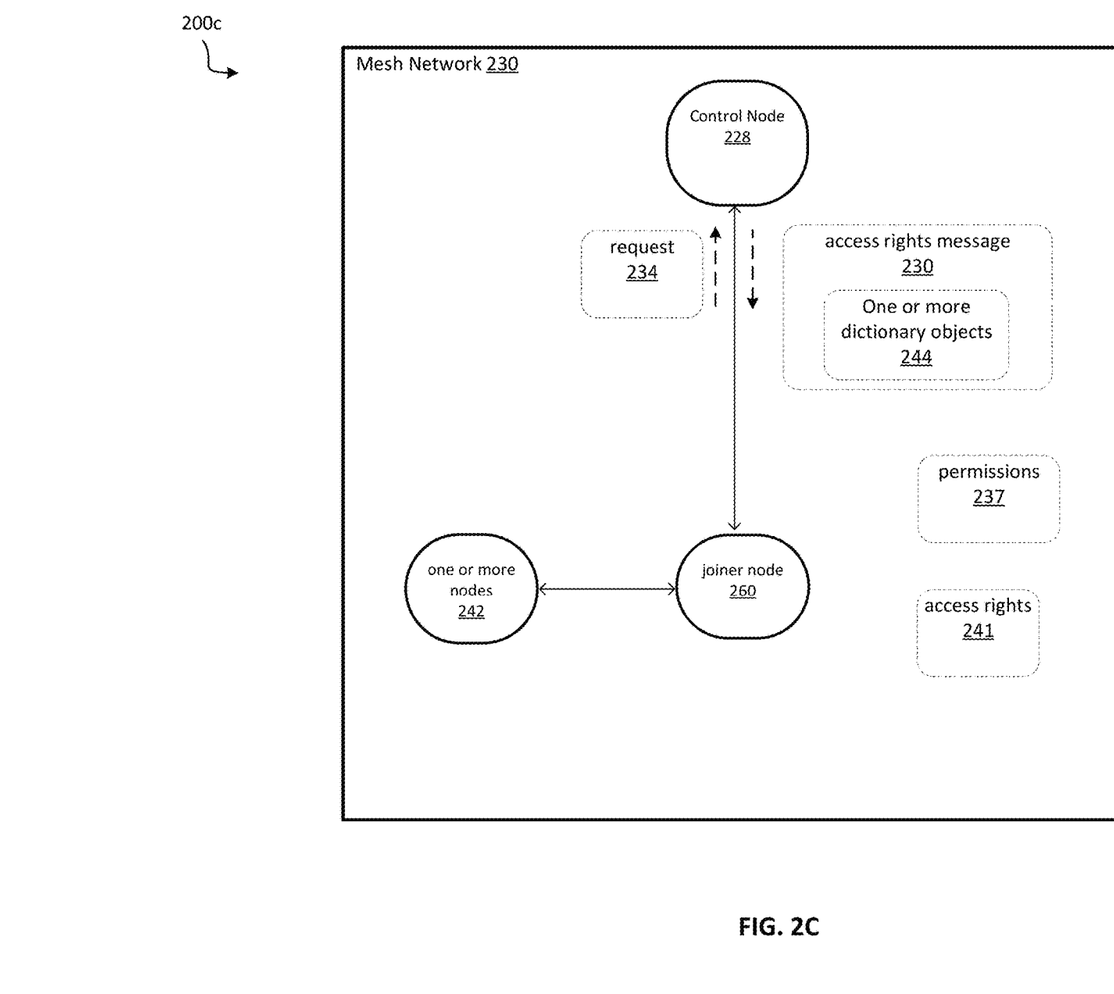
FIG. 2C is a block diagram depicting an example environment of a mesh network system 102, according to some embodiments.

FIG. 2C is a block diagram depicting an example environment of a mesh network system 102, according to some embodiments. The environment 200*c* includes a mesh network 230 (e.g., mesh network system 102 in FIG. 1). The mesh network 230 includes a control node 228 (e.g., control mesh node 108 in FIG. 1), a joiner node 260 (e.g., mesh node 104*a* in FIG. 1), and one or more nodes 242 (e.g., mesh node 104*b* and mesh node 104*c* in FIG. 1).

The control node 228 receives a request 234 from the joiner node 260 to join the mesh network 230. The control node 228 validates the permissions 237 for the joiner node 260 responsive to receiving the request 234. The control node 228 acquires one or more dictionary objects 244 based on the permissions 237. The control node 228 grants access rights 241 for the joiner node 260 to join the mesh network 230 by transmitting an access rights message 230 comprising the one or more dictionary objects 244 to the joiner node 260, wherein the access rights message 230 causes the joiner node 260 to locally store the one or more dictionary objects 244 and use the one or more dictionary objects 244 when communicating with one or more nodes 242 of the mesh network 230.

Figure 3:
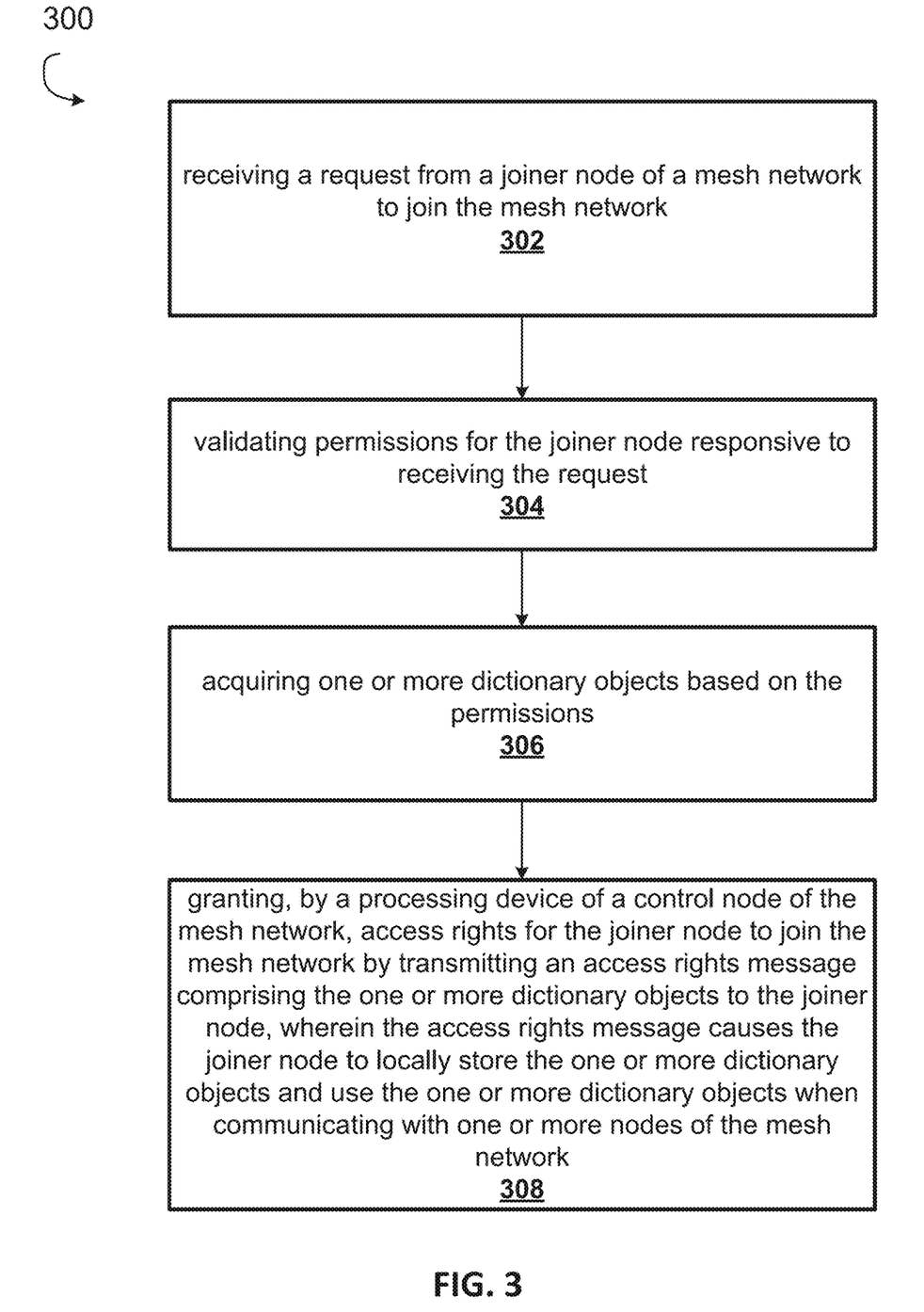
FIG. 3 is a flow diagram depicting a method of protecting communication in a mesh network of nodes, according to some embodiments.

FIG. 3 is a flow diagram depicting a method of protecting communication in a mesh network of nodes, according to some embodiments. Method 300 may be performed by processing logic that may include hardware (e.g., circuitry, dedicated logic, programmable logic, a processor, a processing device, a central processing unit (CPU), a system-on-chip (SoC), etc.), software (e.g., instructions and/or an application that is running/executing on a processing device), firmware (e.g., microcode), or a combination thereof. In some embodiments, method 300 may be performed by a control mesh node, such as control mesh node 108 in FIG. 1. In some embodiments, method 300 may be performed by one or more mesh nodes, such as mesh nodes 104 in FIG. 1. In some embodiments, method 300 may be performed by a mesh network system, such as mesh network system 102 in FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

As shown in FIG. 3, the method 300 includes the block 302 of receiving a request from a joiner node of a mesh network to join the mesh network. The method 300 includes the block 304 of validating permissions for the joiner node responsive to receiving the request. The method 300 includes the block 306 of acquiring one or more dictionary objects based on the permissions. The method 300 includes the block 308 of granting, by a processing device of a control node of the mesh network, access rights for the joiner node to join the mesh network by transmitting an access rights message comprising the one or more dictionary objects to the joiner node, wherein the access rights message causes the joiner node to locally store the one or more dictionary objects and use the one or more dictionary objects when communicating with one or more nodes of the mesh network.

Figure 4:
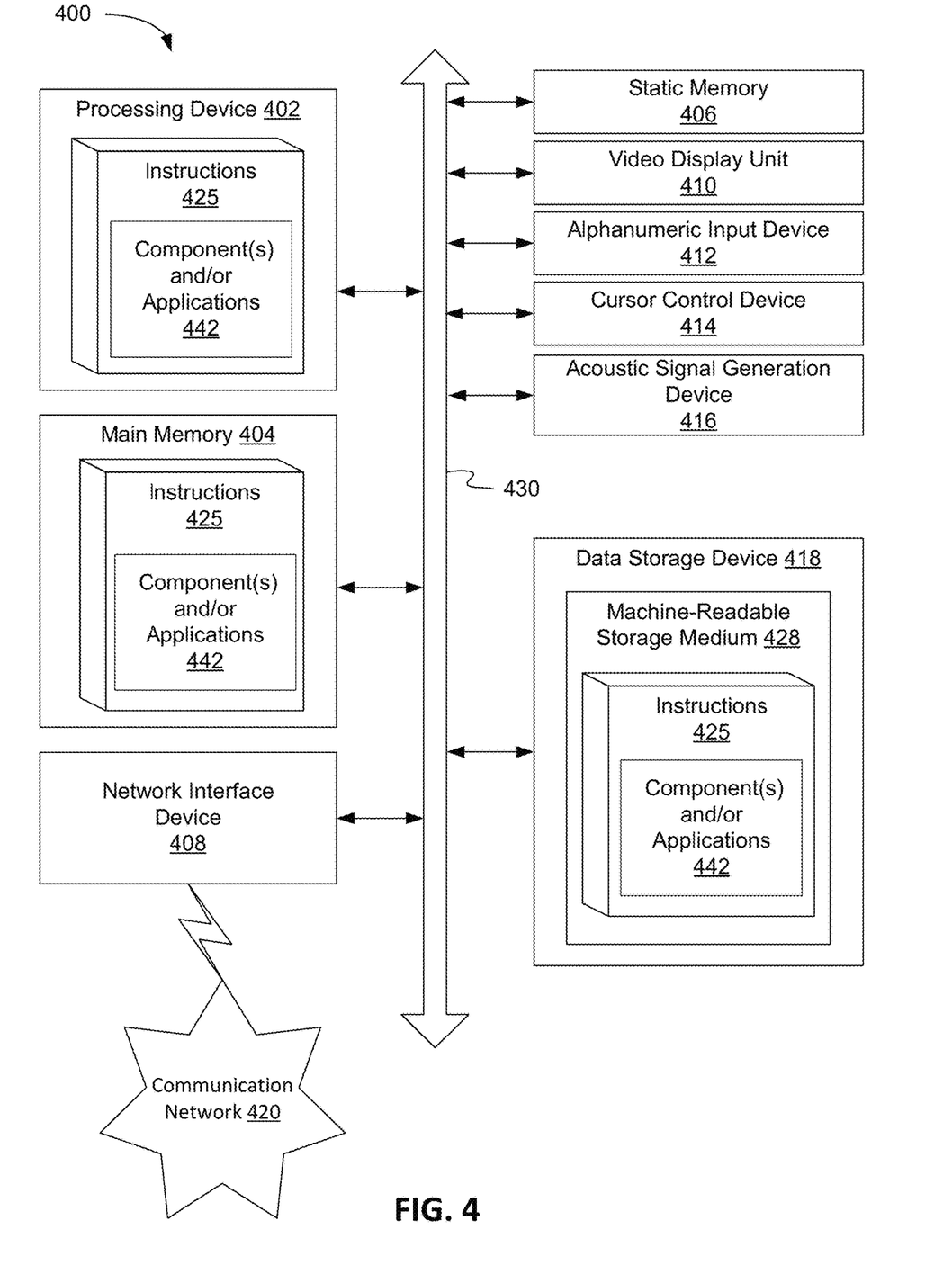
FIG. 4 is a block diagram of an example computing device that may perform one or more of the operations described herein, in accordance with some embodiments.

FIG. 4 is a block diagram of an example computing device 400 that may perform one or more of the operations described herein, in accordance with some embodiments. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also include one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein.

Computing device 400 may further include a network interface device 408 which may communicate with a communication network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions 425 that may include instructions for one or more components, agents, and/or applications 442 (e.g., MDC agent 105 in FIG. 2A, MDS agent 109 in FIG. 2B) for carrying out the operations described herein, in accordance with one or more aspects of the present disclosure. Instructions 425 may also reside, completely or at least partially, within main memory 404 and/or within processing device 402 during execution thereof by computing device 400, main memory 404 and processing device 402 also constituting computer-readable media. The instructions 425 may further be transmitted or received over a communication network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "validating," "acquiring," "granting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to"

perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method of protecting communication in a mesh network of nodes, the method comprising:
   receiving a request from a joiner node of the mesh network to join a public subnetwork of the mesh network;
   validating one or more permissions for the joiner node responsive to receiving the request;
   creating, based on the permissions, a private dictionary object and a public dictionary object, the private dictionary object associated with a private subnetwork of the mesh network and the public dictionary object associated with the public subnetwork of the mesh network; and
   granting, by a processing device of a control node of the mesh network, access rights for the joiner node to join the public subnetwork of the mesh network by transmitting an access rights message comprising the private dictionary object associated with the private subnetwork and the public dictionary object associated with the public subnetwork to the joiner node of the public subnetwork of the mesh network, wherein the access rights message causes the joiner node to locally store the private and the public dictionary object and use at least one of the private dictionary object or public dictionary object when communicating with one or more nodes of the mesh network.

2. The method of claim 1, wherein validating the permissions of the joiner node comprises:
   determining a first permission of the one or more permissions of the joiner node to join the public subnetwork of the mesh network; and
   determining a second permission of the one or more permissions of the joiner node to join the private subnetwork of the mesh network.

3. The method of claim 2, wherein creating the public dictionary object is further based
   on a base class and a set of variable values associated with the public subnetwork, and wherein creating the private dictionary object is further based on the base class and a different set of variables associated with the private subnetwork.

4. The method of claim 2, wherein creating the public dictionary object and the private dictionary object are each further based on different base classes.

5. The method of claim 2, wherein the access rights message further causes the joiner node to decrypt, using the public dictionary object, a first message received from a first node of the public subnetwork to generate a first decrypted message.

6. The method of claim 5, wherein the access rights message further causes the joiner node to decrypt, using the private dictionary object, a second message received from a second node of the private subnetwork to generate a second decrypted message, and generate a response message using the private dictionary object to send to the second node of the private subnetwork.

7. The method of claim 6, wherein the second message comprises at least one of an application programming interface (API) endpoint, a seed phrase, or an access token.

8. The method of claim 2, wherein the access rights message further causes the joiner node to decrypt, using the public dictionary object, a first portion of a first message received from a first node of the public subnetwork to generate a first decrypted message, and determine an inability of the joiner node to decrypt a second portion of the first message.

9. The method of claim 8, wherein the access rights message further causes the joiner node to forward, responsive to determining the inability to decrypt the second portion of the first message, the second portion of the first message to a second node of the private subnetwork.

10. The method of claim 1, further comprising:
    determining a timing for updating one or more dictionary objects comprising at least one of the private dictionary object or the public dictionary object;
    acquiring an updated set of the one or more dictionary objects responsive to determining the timing; and
    transmitting the updated set of the one or more dictionary objects to the joiner node to cause the joiner node to update the one or more dictionary objects locally stored on the joiner node using the updated set of the one or more dictionary objects.

11. The method of claim 10, wherein determining the timing comprises:
    determining a change in the permissions for the joiner node;

determining a change in available services of the mesh network; or determining that one or more nodes of the mesh network have been subjected to a malicious attack that originated from outside the mesh network.

12. A mesh network system, comprising:

a plurality of computing devices, wherein each computing device corresponds to a respective node of a plurality of nodes of the mesh network system, each computing device comprises a processing device, wherein the processing device of a control node of the plurality of nodes to:

receive a request from a joiner node to join a public subnetwork of the mesh network;

validate one or more permissions for the joiner node responsive to receiving the request;

create, based on the permissions, a private dictionary object and a public dictionary object, the private dictionary object associated with a private subnetwork of the mesh network and the public dictionary object associated with the public subnetwork of the mesh network; and grant access rights for the joiner node to join the public subnetwork of the mesh network by transmitting an access rights message comprising the private dictionary object associated with the private subnetwork and the public dictionary object associated with the public subnetwork to the joiner node of the public subnetwork of the mesh network, wherein the access rights message causes the joiner node to locally store the private dictionary object and the public dictionary object and use at least one of the private dictionary object or the public dictionary object when communicating with one or more nodes of the mesh network.

13. The mesh network system of claim 12, wherein the processing device of the control node further to:

determine a first permission of the one or more permissions of the joiner node to join the public subnetwork of the mesh network; and determine a second permission of the one or more permissions of the joiner node to join the private subnetwork of the mesh network.

14. The mesh network system of claim 13, wherein to create the public dictionary object is further based on a base class and a set of variable values associated with the public subnetwork, and wherein to create the private dictionary object is further based on the base class and a different set of variables associated with the private subnetwork.

15. The mesh network system of claim 13, wherein to create the public dictionary object and the private dictionary object are each further based on different base classes.

16. The mesh network system of claim 13, wherein the access rights message further causes the joiner node to decrypt, using the public dictionary object, a first message received from a first node of the public subnetwork to generate a first decrypted message.

17. The mesh network system of claim 16, wherein the access rights message further causes the joiner node to decrypt, using the private dictionary object, a second message received from a second node of the private subnetwork to generate a second decrypted message, and generate a response message using the private dictionary object to send to the second node of the private subnetwork.

18. The mesh network system of claim 13, wherein the access rights message further causes the joiner node to decrypt, using the public dictionary object, a first portion of a first message received from a first node of the public subnetwork to generate a first decrypted message, and determine an inability of the joiner node to decrypt a second portion of the first message.

19. The mesh network system of claim 12, wherein the processing device of the control node further to:

determine a timing for updating one or more dictionary objects comprising at least one of the private dictionary object or the public dictionary object;

acquire an updated set of the one or more dictionary objects responsive to determining the timing; and transmit the updated set of the one or more dictionary objects to the joiner node to cause the joiner node to update the one or more dictionary objects locally stored on the joiner node using the updated set of the one or more dictionary objects.

20. A non-transitory computer-readable medium storing instructions that, when execute by a processing device of a control node of a mesh network system, cause the processing device to:

receive a request from a joiner node to join a public subnetwork of the mesh network;

validate one or more permissions for the joiner node responsive to receiving the request;

create, based on the permissions, a private dictionary object and a public dictionary object, the private dictionary object associated with a private subnetwork of the mesh network and the public dictionary object associated with the public subnetwork of the mesh network; and grant, by the control node of the mesh network system, access rights for the joiner node to join the public subnetwork of the mesh network by transmitting an access rights message comprising the private dictionary object associated with the private subnetwork and the public dictionary object associated with the public subnetwork to the joiner node of the public subnetwork of the mesh network, wherein the access rights message causes the joiner node to locally store the private dictionary object and the public dictionary object and use at least one of the private dictionary object or the pubic dictionary object when communicating with one or more nodes of the mesh network.

* * * * *